(12) United States Patent
Suh et al.

(10) Patent No.: US 9,216,776 B2
(45) Date of Patent: Dec. 22, 2015

(54) FOLDABLE VEHICLE AND METHOD OF CONTROLLING THE SAME

(71) Applicant: Korea Advanced Institute of Science and Technology, Daejeon (KR)

(72) Inventors: In Soo Suh, Daejeon (KR); Ka Ram Hwang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 25 days.

(21) Appl. No.: 14/280,811

(22) Filed: May 19, 2014

(65) Prior Publication Data
US 2015/0183472 A1 Jul. 2, 2015

(30) Foreign Application Priority Data
Dec. 27, 2013 (KR) ........................ 10-2013-0165342

(51) Int. Cl.
*B62D 31/00* (2006.01)
(52) U.S. Cl.
CPC .................................... *B62D 31/006* (2013.01)
(58) Field of Classification Search
CPC .................................................... B62D 31/006
USPC ........... 296/165, 173, 176, 172, 26.01, 26.11, 296/26.1, 181.7, 107.16, 107.17; 280/278, 280/287; 180/208
See application file for complete search history.

(56) References Cited

U.S. PATENT DOCUMENTS

| | | | | |
|---|---|---|---|---|
| 3,850,472 A * | 11/1974 | Greppi | ........................ | 296/26.11 |
| 4,340,124 A * | 7/1982 | Leonard | ........................ | 180/208 |
| 5,087,091 A * | 2/1992 | Madill | ........................ | 296/26.11 |
| 6,474,714 B1 * | 11/2002 | Stettner | ........................ | 296/26.08 |
| 8,627,910 B1 * | 1/2014 | Carque | ........................ | 180/65.1 |

FOREIGN PATENT DOCUMENTS

JP H08-133146 A 5/1996

* cited by examiner

*Primary Examiner* — Joseph D Pape
(74) *Attorney, Agent, or Firm* — Paratus Law Group, PLLC

(57) ABSTRACT

A foldable vehicle which has a vehicle body divided into two sections of a front section and a rear section and has a size reduced by rotating the rear section of the divided vehicle body to be folded with respect to the front section thereof. The foldable vehicle includes a front vehicle body having a front wheel; a rear vehicle body having a rear wheel and having a lower front end rotatably connected to a lower rear end of the front vehicle body through a rotating shaft to rotate around the rotating shaft in a vertical direction, thereby being folded to overlap with the front vehicle body or unfolded; a folding drive unit for folding or unfolding the vehicle bodies by rotating the rear vehicle body with respect to the front vehicle body; and a control unit for controlling the operation of the folding drive unit.

15 Claims, 12 Drawing Sheets

FOLDABLE VEHICLE AND METHOD OF CONTROLLING THE SAME

CROSS REFERENCE TO PRIOR APPLICATIONS

The present application claims priority under 35 U.S.C. §119 to Korean Patent Application No. 10-2013-0165342 (filed on Dec. 27, 2013), which is hereby incorporated by reference in its entirety.

BACKGROUND OF THE INVENTION

1. Field of Invention

The present invention relates to a foldable vehicle, and more particularly, to a foldable vehicle, which has a vehicle body divided into two sections of a front section and a rear section and has a size reduced by rotating the rear section of the divided vehicle body to be folded with respect to the front section thereof, and a method of controlling the foldable vehicle.

2. Description of the Prior Art

A foldable vehicle is a vehicle that has been developed for solving a problem of a few parking spaces in downtown, and has an advantage in that the vehicle can be parked in a narrow parking space, in which a general vehicle from a small car to large one cannot be parked, by reducing its size through a folding action.

As a foldable vehicle, there is an electric vehicle named HIRIKO developed by MIT Media Lab along with Basque self-government, Spain. The electric vehicle is configured to have four wheel motors independently controlled and to have a vehicle body divided into two sections of a front section and a rear section to be foldable so that the front section slides on top of the rear section.

However, since such a conventional foldable vehicle should move the section mounted with a battery in the vehicle when performing the folding action, there is a problem in that great amounts of energy are needed to perform the folding action.

PRIOR ART DOCUMENT

Patent Document 1: Japanese Laid-open Patent Publication H8-133146 (Publication Date: May 28, 1996) "Foldable Vehicle"

SUMMARY OF THE INVENTION

Accordingly, the present invention is conceived to solve the aforementioned problems in the prior art. An object of the present invention is to provide a foldable vehicle, which makes it possible to perform a folding action using a small amount of energy by rotating a rear section of a vehicle body mounted with no battery to overlap with a front section of the vehicle body and to maintain a stable posture of the vehicle when the folding action is performed, and a method of controlling the foldable vehicle.

According to an aspect of the present invention for achieving the objects, there is provided a foldable vehicle including: a front vehicle body having a front wheel; a rear vehicle body having a rear wheel and having a lower front end rotatably connected to a lower rear end of the front vehicle body through a rotating shaft to rotate around the rotating shaft in a vertical direction, thereby being folded to overlap with the front vehicle body or unfolded; a folding drive unit for folding or unfolding the vehicle bodies by rotating the rear vehicle body with respect to the front vehicle body; and a control unit for controlling the operation of the folding drive unit.

According to one embodiment of the present invention, the foldable vehicle of the present invention may further include support units extending downward from a rear end of the front vehicle body to support the rear end of the front vehicle body on a ground surface when the rear vehicle body is rotated with respect to the front vehicle body to be folded or unfolded.

According to another embodiment of the present invention, the foldable vehicle of the present invention may further include locking units installed to the front vehicle body to lock the rear vehicle body to the front vehicle body at a position where the rear vehicle body is folded with respect to the front vehicle body and a position where the rear vehicle body is unfolded with respect to the front vehicle body.

According to another aspect of the present invention, there is provided a method of controlling a foldable vehicle, including: (a) detecting an unfolded state and a folded state of a rear vehicle body; (b) supplying a folding drive unit with power to rotate the rear vehicle body upward around a rotating shaft and overlap the rear vehicle body with a front vehicle body; and (c) stopping the act of the folding drive unit when the folded state of the rear vehicle body is detected if the rear vehicle body is in a predetermined position with respect to the front vehicle body.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENT

Hereinafter, preferred embodiments of a foldable vehicle and a method of controlling the same according to the present invention will be described in detail with reference to the accompanying drawings.

Figure 1:
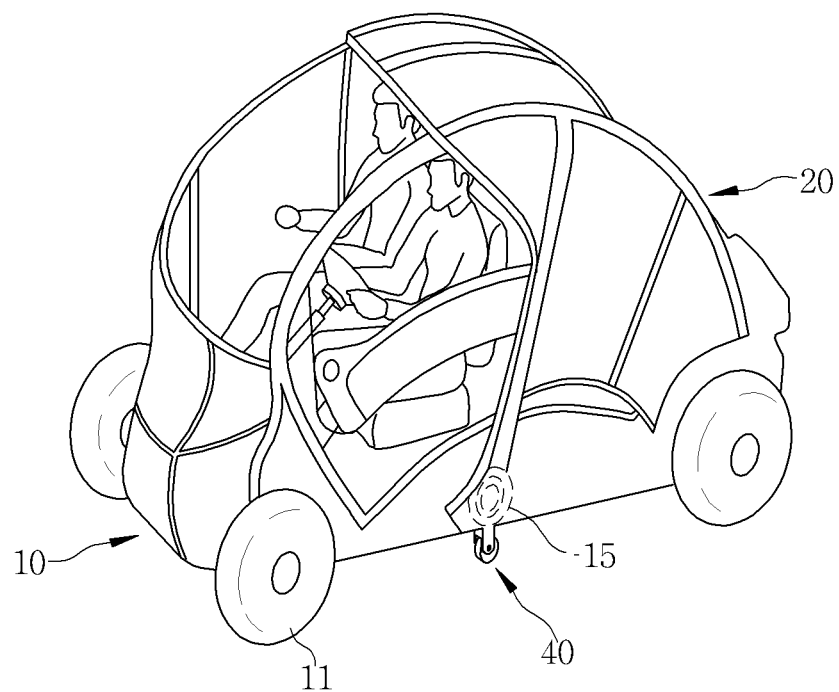
FIG. 1 is a perspective view showing an embodiment of a foldable vehicle with a vehicle body unfolded according to the present invention.
Figure 2:
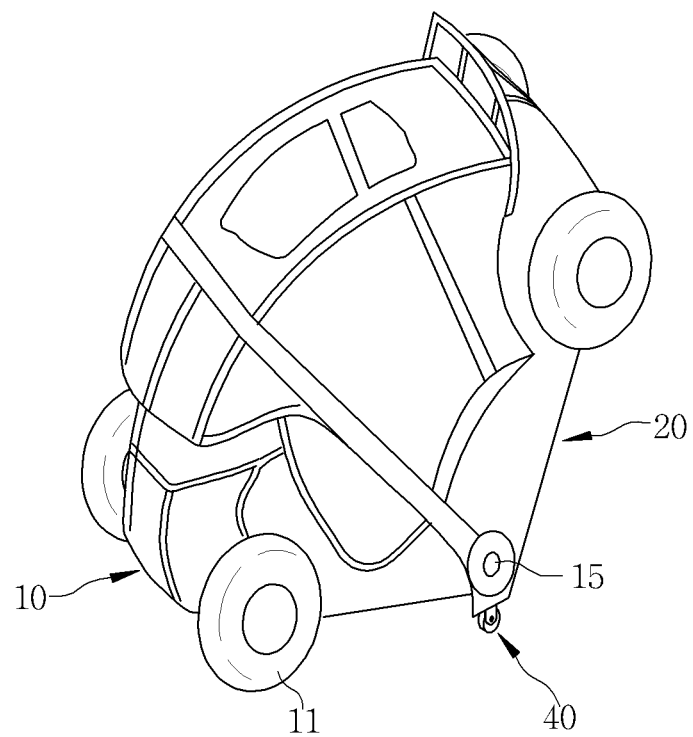
FIG. 2 is a view showing that the vehicle body of the foldable vehicle of FIG. 1 is folded.
Figure 3:
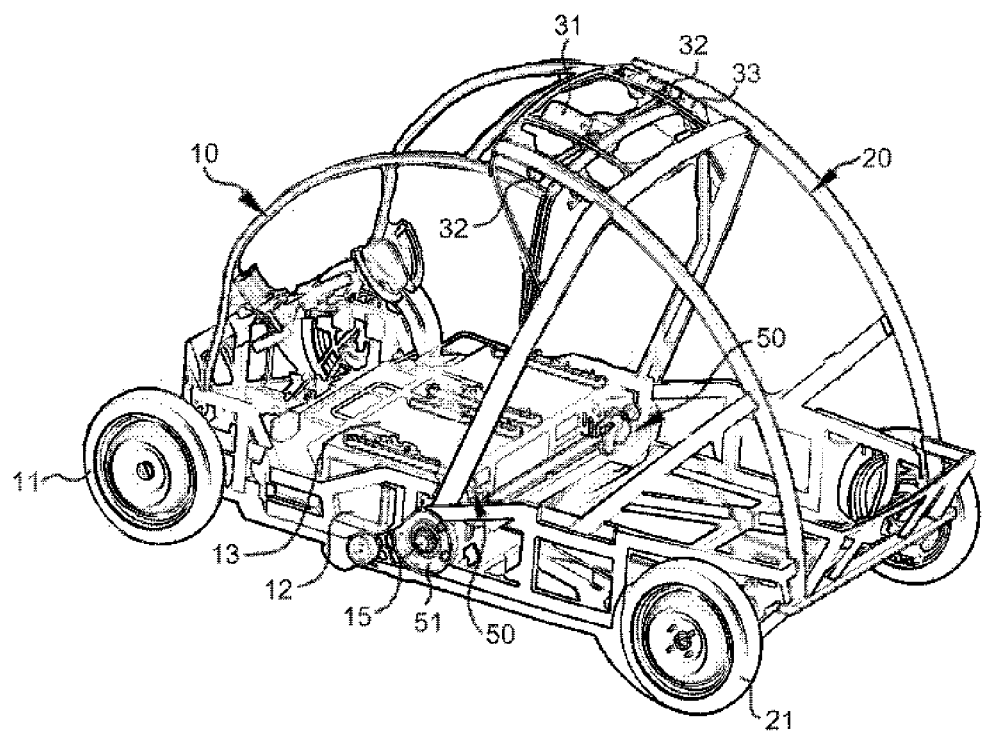
FIG. 3 is a perspective view showing only main configurations of the foldable vehicle of FIG. 1.
Figure 4:
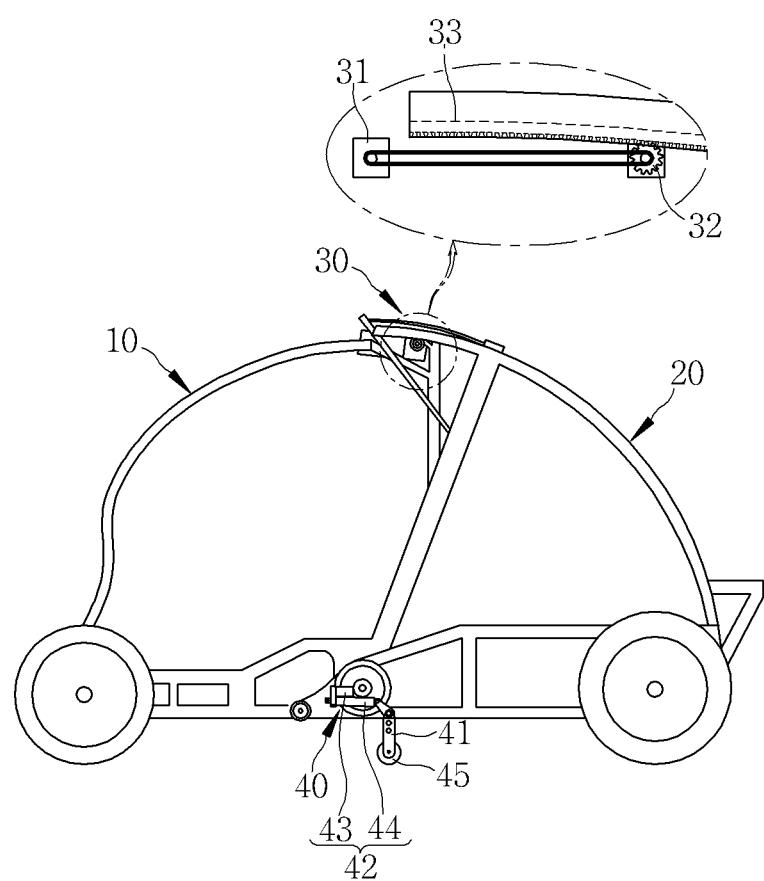
FIG. 4 is a side view of the foldable vehicle of FIG. 1.
Figure 5A:
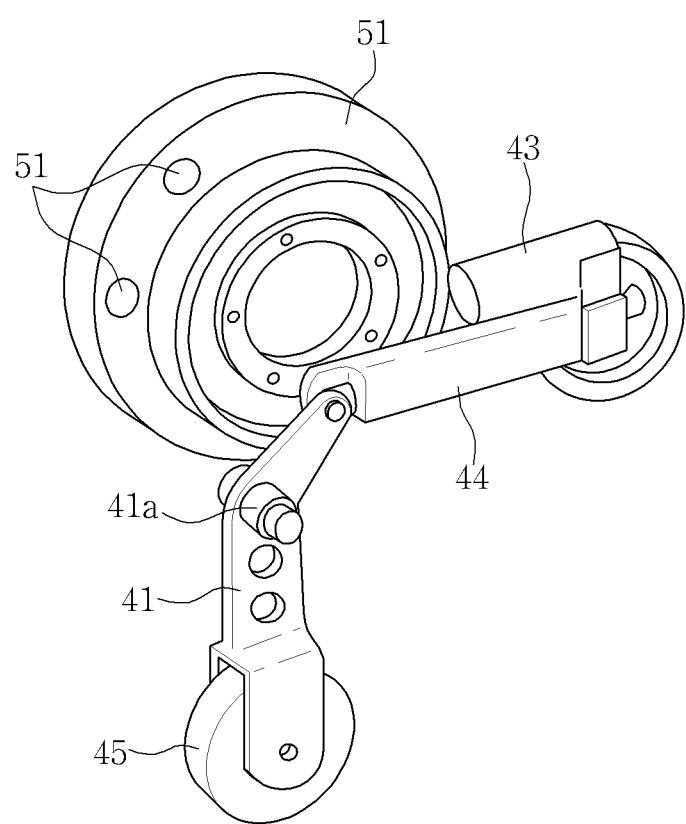
FIGS. 5*a* and 5*b* are perspective views showing a support unit of the foldable vehicle of FIG. 1 and an operation example thereof.
Figure 5B:
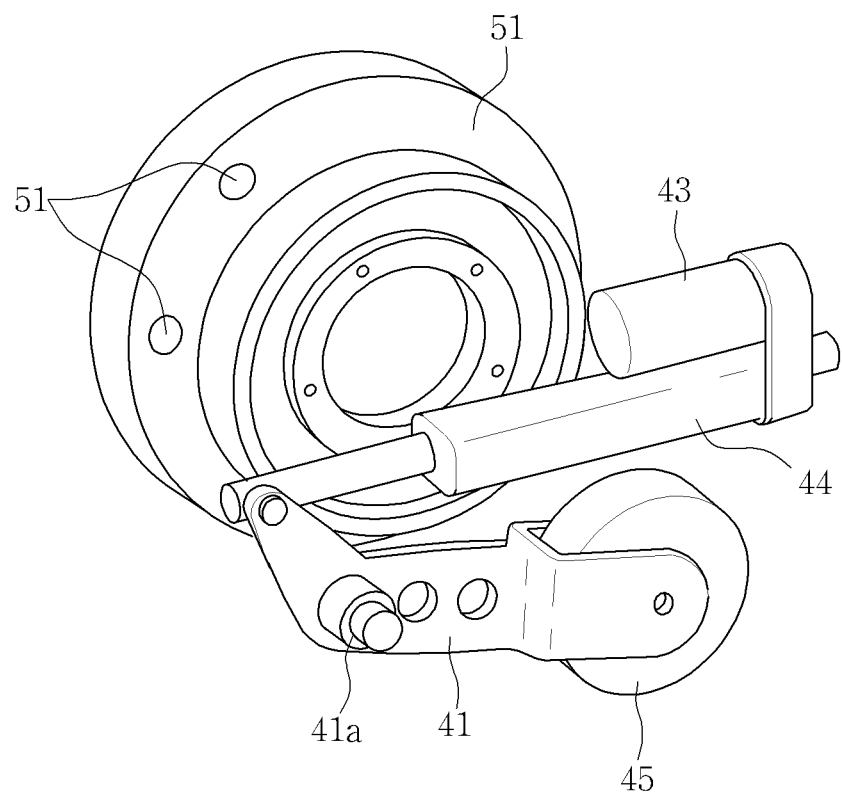
Figure 6:
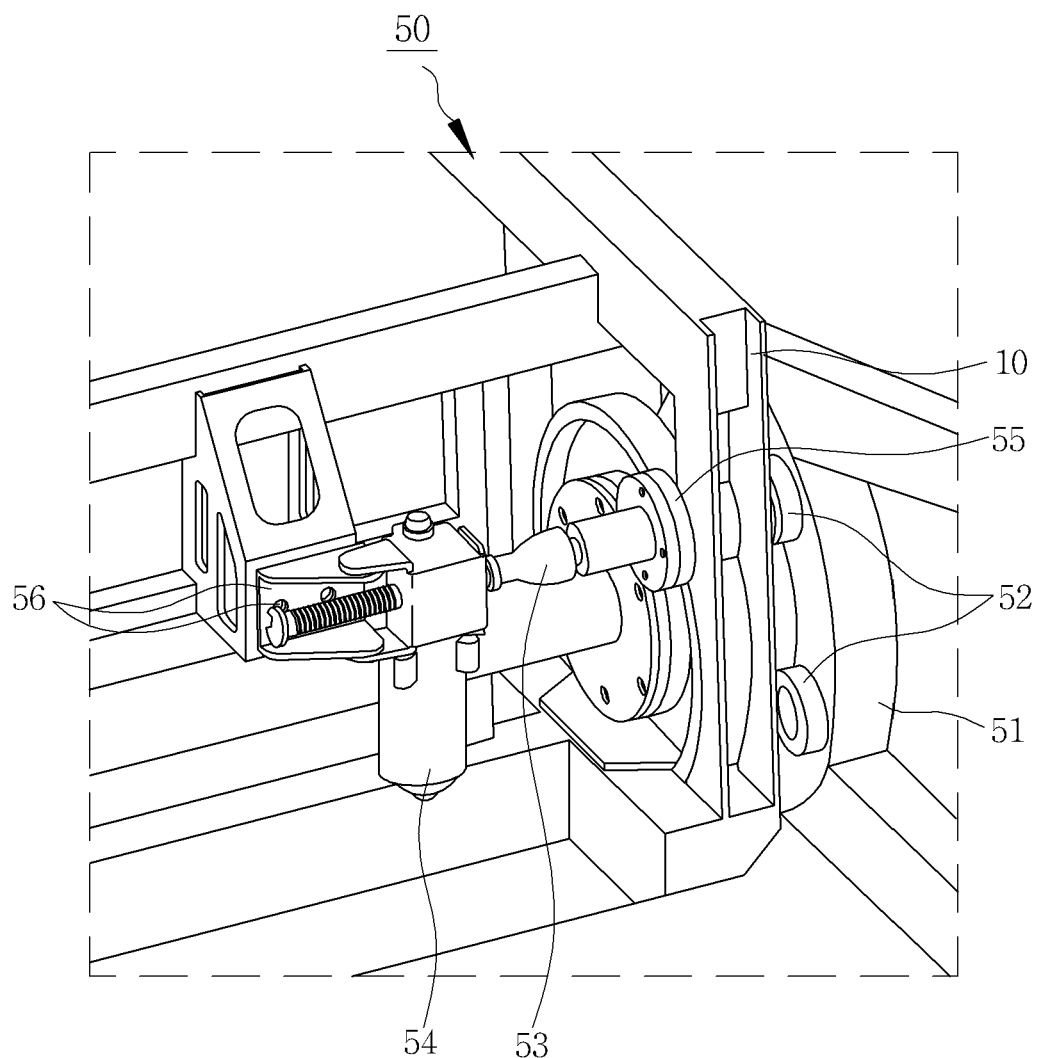
FIGS. 6*a* and 6*b* are side views showing a locking unit of FIG. 5.
Figure 7A:
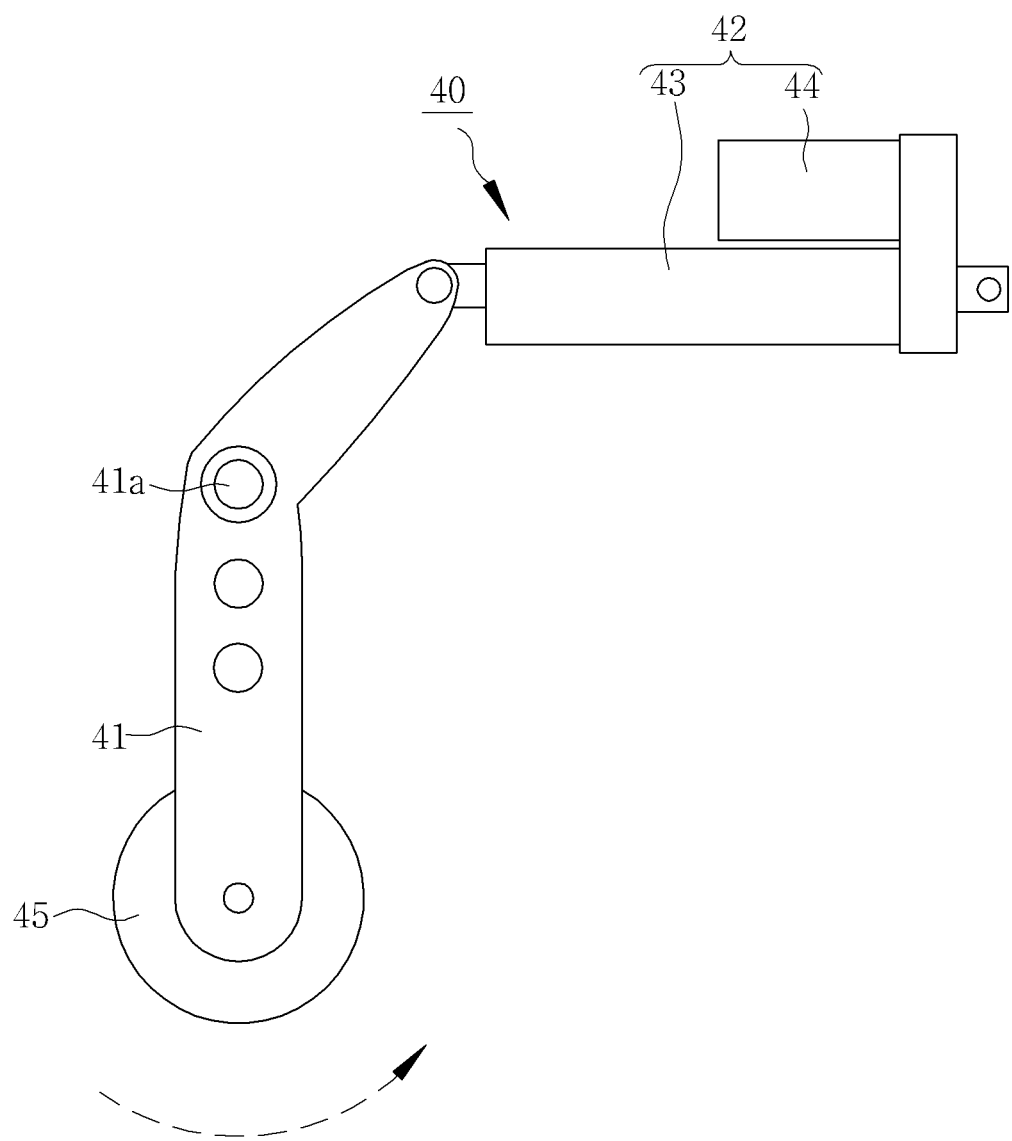
FIG. 7 is a perspective view showing the locking unit of the foldable vehicle of FIG. 1.
Figure 7B:
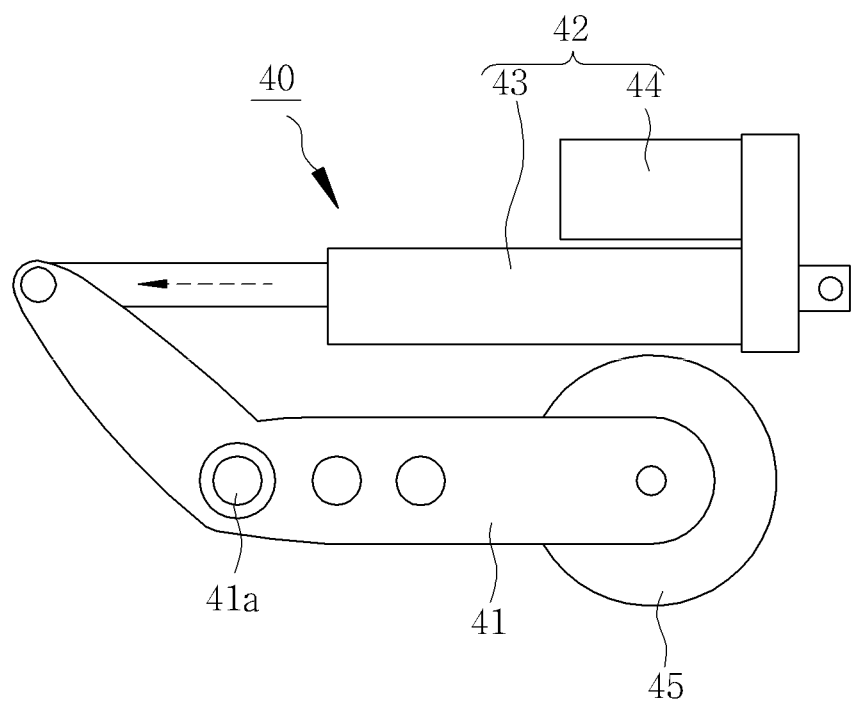
Figure 8A:
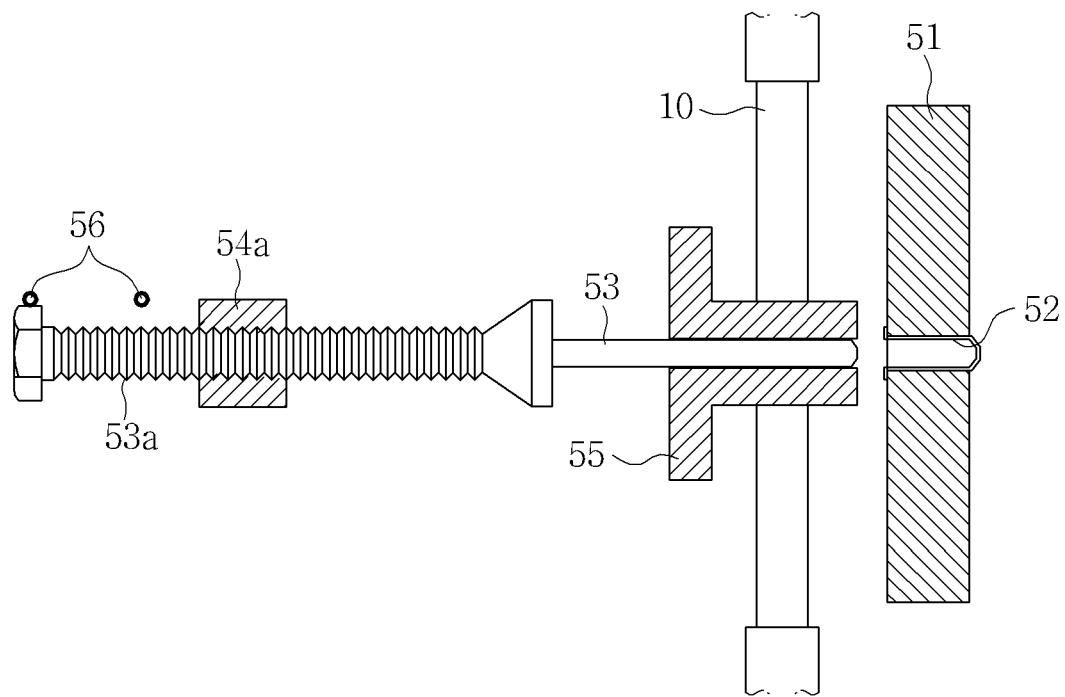
FIGS. 8*a* and 8*b* are sectional views of the locking unit of FIG. 7.
Figure 8B:
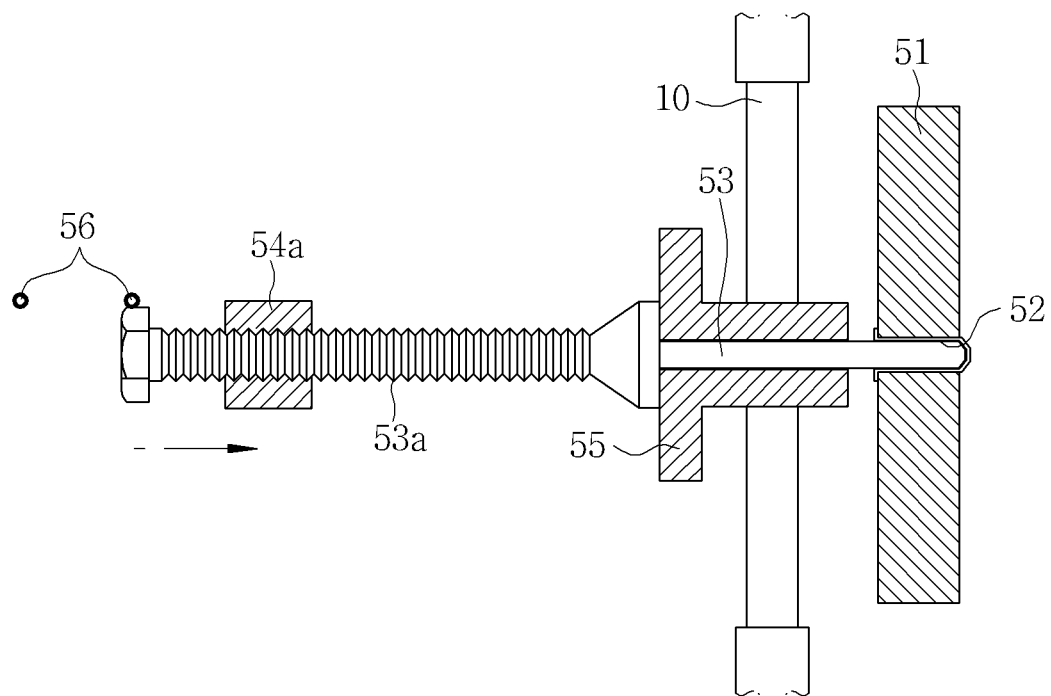
Figure 9:
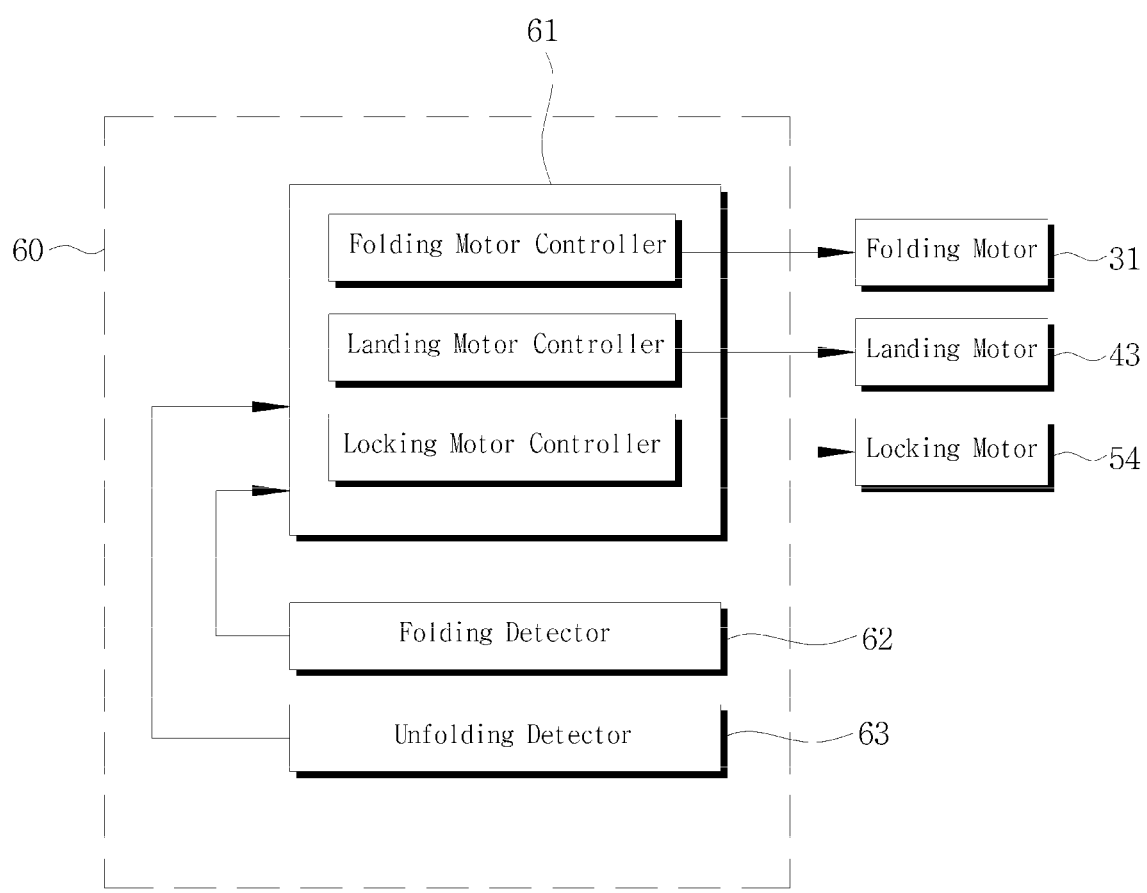
FIG. 9 is a block diagram schematically illustrating the configuration of a control unit of the foldable vehicle of FIG. 1.

Referring to FIGS. 1 to 9, a foldable vehicle according to an embodiment of the present invention includes a front vehicle body 10 having front wheels 11, a rear vehicle body 20 having a lower front end rotatably connected to a lower rear end of the front vehicle body 10 through a rotating shaft 15 to rotate around the rotating shaft 15 in the vertical direction, thereby being folded to overlap with the front vehicle body 10 or unfolded, a folding drive unit 30 for folding or unfolding the vehicle bodies by rotating the rear vehicle body 20 with respect to the front vehicle body 10, support units 40 for supporting the rear end of the front vehicle body 10 on a ground surface when the rear vehicle body 20 is rotated with respect to the front vehicle body 10 to be folded or unfolded, locking units 50 for locking the rear vehicle body 20 to the front vehicle body 10 at a position where the rear vehicle body 20 is folded with respect to the front vehicle body 10 and a position where the rear vehicle body 20 is unfolded with respect to the front vehicle body 10, and a control unit 60 for controlling the operation of the folding drive unit 30, and the support units 40 and the locking units 50.

The front vehicle body 10 is provided with two front wheels 11, a battery 12, seats 13, and the like and occupies about a half of the entire vehicle body. The rotating shaft 15 is installed at the rear lower end of the front vehicle body 10.

The rear vehicle body 20 is provided with two rear wheels 21, and has both ends free-rotatably connected to both ends of the rotating shaft 15 to rotate about the rotating shaft 15 by the folding drive unit 30 in the vertical direction to be folded or unfolded with respect to the front vehicle body 10. Here, the rear vehicle body 20 is overlapped and folded on the rear side of the front vehicle body 10.

The folding drive unit 30 includes a folding motor 31 installed at the upper end of the front vehicle body 10 to be operated by power supplied from the control unit 60, two pinion gears 32 coupled with the folding motor 31 to rotate, and two rack gears 33 meshed with the pinion gears 32 and installed at the upper end of the rear vehicle body 20 to extend in the fore and aft direction. Here, the two rack gears 33 each are formed in a curved shape having a curvature corresponding to a trace of the rotation of the rear vehicle body 20 around the rotating shaft 15, and are disposed in parallel in the upper side of the rear vehicle body 20. In addition, the two pinion gears 32 meshed with the rack gears 33 are connected to a single shaft and are simultaneously rotated by the single folding motor 31.

In the folding drive unit 30 so configured, if the folding motor 31 is supplied with power from the control unit 60 to operate the folding motor 31, the pinion gears 32 rotate and the rack gears 33 meshed with the pinion gears 32 move in the fore and aft direction of the vehicle body, thereby rotating the rear vehicle body 20 around the rotating shaft 15 with respect to the front vehicle body 10 in the vertical direction.

The support units 40 are installed at the lower rear end of the front vehicle body 10 to function as supports, which enable the stable folding action (folding/unfolding action) to be realized by supporting the rear end of the front vehicle body 10 on the ground surface when the rear vehicle body 20 is rotated and folded or unfolded with respect to the front vehicle body 10. The support units 40 may be fixedly installed to the front vehicle body 10. However, as in this embodiment, the support units 40 may be vertically rotated with respect to the front vehicle body 10, so that when the vehicle is driven, the support units 40 are rotated upward to be spaced apart from the ground surface not to interfere with the ground surface or obstructions thereon and are lowered only when the folding action is performed to support the front vehicle body 10.

In this embodiment, each of the support units 40 includes a landing member 41 installed so as to be vertically rotated around a hinge shaft 41a at each of both the sides of the rear end of the front vehicle body 10 and a landing driver 42 for rotating the landing member 41 to move the lower end of the landing member 41 between a position where the lower end is spaced apart from the ground surface and a position where the lower end is in contact with the ground surface according to the folding action of the rear vehicle body 20. A roller 45 may be installed at the lower end of the landing member 41 so as to freely rotate.

The landing driver 42 includes a landing motor 43 supplied with power from the control unit 60 to operate according to the folding action of the rear vehicle body 20 and a piston assembly 44 having one end connected to the upper end of the landing member 41 and the other end connected to the landing motor 43 to be extended and contracted by the operation of the landing motor 43.

The locking units 50 enlarge rigidity of the vehicle by locking the rear vehicle body 20 to the front vehicle body 10 at the position where the rear vehicle body 20 is folded with respect to the front vehicle body 10 and the position where the rear vehicle body 20 is unfolded with respect to the front vehicle body 10 and secure robustness in folded and unfolded states.

In this embodiment, each of the locking units 50 includes a locking block 51 installed at one side of the lower end of the rear vehicle body 20 and fitted around one end of the rotating shaft 15 to rotate around the rotating shaft 15 and having a plurality (two in this embodiment) of locking openings 52 formed along the circumferential direction; a locking pin 53 horizontally movably installed at one side of the front vehicle body 10 to lock the locking block 51 by being inserted into one of the locking openings 52; a pin guide member 55 formed in a cylindrical shape having both open ends and fixedly installed to one side frame of the front vehicle body 10 to allow the locking pin 53 to be movably inserted; a locking motor 54 horizontally moving the locking pin 53 by power supplied from the control unit 60; two locking detection switches 56 installed at one side of the locking motor 54 to be spaced apart from each other to detect a state in which the locking pin 53 is inserted in the locking opening 52 and a state in which the locking pin 53 is pulled out of the locking opening 52.

A thread portion 53a is formed on the outer peripheral surface of the locking pin 53, and a pin drive gear 54a, which is threadedly engaged with the thread portion 53a and is rotated by the locking motor 54 to move the locking pin 53, is connected to the locking motor 54. Therefore, if the locking motor 54 is supplied with power to rotate the pin drive gear 54a, the locking pin 53 threadedly engaged with the pin drive gear 54a rotates and horizontally moves. At this time, while being guided by the pin guide member 55, the locking pin 53 is inserted into the locking opening 52 of the locking block 51 to lock the locking block 51. Accordingly, the rear vehicle body 20 is locked to the front vehicle body 10, thereby not being moved.

A bearing housing, in which a bearing coupled to the rotating shaft 15 is installed, may be provided in the inner peripheral surface of the locking block 51. The positions of the locking openings 52 provided in the locking block 51 are set so that the locking openings 52 respectively coincide in position with the pin guide member 55 at the position where the rear vehicle body 20 is fully folded with respect to the front vehicle body 10 and the position where the rear vehicle body 20 is fully unfolded with respect to the front vehicle body 10.

Although the locking unit 50 may be provided only in one side of the front vehicle body 10, the locking unit 50 is preferably provided at each of both the sides of the lower rear end of the front vehicle body 10 as in this embodiment.

Meanwhile, the control unit 60 includes a main controller 61 for operating the folding motor 31 of the folding drive unit 30, the landing motor 43 of the support units 40 and the locking motor 54 of the locking units 50 by supplying power thereto, a folding detection unit 62 for detecting a state in which the rear vehicle body 20 is folded with respect to the front vehicle body 10, and an unfolding detection unit 63 for detecting a state in which the rear vehicle body 20 is unfolded with respect to the front vehicle body 10. The folding detection unit 62 and the unfolding detection unit 63 may include well-known sensors or switches.

The foldable vehicle of the present invention so configured will operate as follows.

First, when the rear vehicle body 20 intends to be folded through the rotation from the state in which the rear vehicle body 20 is unfolded with respect to the front vehicle body 10, if a driver manipulates a folding command input device provided in a driver's seat to input a folding action command, the unfolding detection unit 63 of the control unit 60 detects the state in which the rear vehicle body 20 is unfolded and confirms information on whether or not there is a neighboring obstacle or the like.

If the state in which the rear vehicle body 20 is unfolded is detected by the unfolding detection unit 63, the main controller 61 supplies each landing motor 43 with power to contract the piston assembly 44 and thus rotate the landing member 41 down. Accordingly, the roller 45 installed at the lower end of the landing member 41 comes into contact with the ground surface to support the rear end of the front vehicle body 10 on the ground surface. Then, the main controller 61 supplies each locking motor 54 of the locking unit 50 with power to retreat the locking pin 53, thereby moving the distal end of the locking pin 53 out of the first of the locking openings 52 of the locking block 51 to release the locked state of the rear vehicle body 20.

Thereafter, the main controller 61 supplies the folding motor 31 with power to rotate the pinion gears 32, and the rotation of the pinion gears 32 causes the rack gears 33 to move forward, so that the rear vehicle body 20 rotates upward around the rotating shaft 15 with respect to the front vehicle body 10.

If the rear vehicle body 20 rotates to reach the predetermined folding position, the folding detection unit 62 of the control unit 60 detects the state in which the vehicle body is folded and then the operation of the folding motor 31 is stopped. At this time, the second of the locking openings 52 of the locking block 51 comes at the position corresponding to the locking pin 53 and the pin guide member 55. Then, the main controller 61 supplies each locking motor 54 with power to move the locking pin 53 forward. The locking pin 53 is inserted into the second of the locking openings 52 to lock the locking block 51, thereby the rear vehicle body 20 is locked to the front vehicle body 10. With this, the folding action is completed.

If the driver manipulates the folding command input device provided in the driver's seat to input an unfolding action command in order to perform the unfolding action from such a state in which the rear vehicle body 20 is folded with respect to the front vehicle body 10, the folding detection unit 62 of the control unit 60 detects the state in which the rear vehicle body 20 is folded. The main controller 61 then operates the locking motor 54 for the locking pin 53 to be pulled out of the second of the locking openings 52, thereby releasing the locked state of the rear vehicle body 20.

Thereafter, the main controller 61 supplies the folding motor 31 with power to operate the pinion gears 32 and the rack gears 33 to rotate the rear vehicle body 20 downward. If the rear vehicle body 20 is rotated downward around the rotating shaft 15 to be completely unfolded, the unfolding detection unit 63 detects such a state, and the control unit 60 stops the operation of the folding motor 31.

Then, the main controller 61 supplies each locking motor 54 with power again for the locking pin 53 to be inserted into the first of the locking openings 52 of the locking block 51, thereby locking the rear vehicle body 20 to the front vehicle body 10. In addition, as the main controller 61 supplies each landing motor 43 with power to extend the piston assembly 44, the landing member 41 is rotated upward to be spaced apart from the ground surface. With this, the unfolding action is completed.

As described above, in the foldable vehicle according to the present invention, since the rear vehicle body 20 in which the battery is not included rotates with respect to the front vehicle body 10, it is possible to rotate the rear vehicle body 20 to realize the folding action with a small amount of energy.

In addition, the rear end of the front vehicle body 10 is stably supported on the ground surface by the support units 40 when the rear vehicle body 20 is rotated, so that the folding action can be stably performed.

Further, since the rear vehicle body 20 is securely locked to the front vehicle body 10 by the locking units 50 in the folded and unfolded states, entire rigidity of the vehicle body can be improved and the vehicle body is prevented from shaking in a driving state, so that stable driving performance can be obtained.

While the present invention has been described in detail with reference to the embodiments, it will be apparent to those skilled in the art that various substitutions, additions and modifications can be made thereto without departing from the above-described technical spirit. It will be understood that the substitutions, additions and modifications will be considered to fall in the scope of the present invention defined by the appended claims.

What is claimed is:

1. A foldable vehicle, comprising:
a front vehicle body (10) having a front wheel (11);
a rear vehicle body (20) having a rear wheel (21) and having a lower front end rotatably connected to a lower rear end of the front vehicle body (10) through a rotating shaft (15) to rotate around the rotating shaft (15) in a vertical direction, thereby being folded to overlap with the front vehicle body (10) or unfolded;
a folding drive unit (30) for folding or unfolding the vehicle bodies by rotating the rear vehicle body (20) with respect to the front vehicle body (10); and
a control unit (60) for controlling the operation of the folding drive unit (30).

2. The foldable vehicle according to claim 1, further comprising support units (40) extending downward from a rear end of the front vehicle body (10) to support the rear end of the front vehicle body (10) on a ground surface when the rear vehicle body (20) is rotated with respect to the front vehicle body (10) to be folded or unfolded.

3. The foldable vehicle according to claim 2, wherein each of the support units (40) includes a landing member (41) installed to be vertically rotated around a hinge shaft (41a) at each of both sides of the rear end of the front vehicle body (10) and a landing driver (42) for rotating the landing member (41) to move a lower end of the landing member (41) between a position where the lower end is spaced apart from the ground surface and a position where the lower end is in contact with the ground surface according to the folding action of the rear vehicle body (20).

4. The foldable vehicle according to claim 3, wherein a roller (45) is installed at the lower end of the landing member (41) to freely rotate.

5. The foldable vehicle according to claim 3, wherein the landing driver (42) includes a landing motor (43) supplied with power from the control unit (60) to operate according to the folding action of the rear vehicle body (20) and a piston assembly (44) having one end connected to an upper end of the landing member (41) and the other end connected to the landing motor (43) to be extended and contracted by operation of the landing motor (43).

6. The foldable vehicle according to claim 1, wherein the folding drive unit (30) includes a folding motor (31) installed at an upper end of the front vehicle body (10) to be operated by power supplied from the control unit (60), a pinion gear (32) coupled with the folding motor (31) to rotate, and a rack gear (33) meshed with the pinion gear (32) and installed at an upper end of the rear vehicle body (20) to extend in a fore and aft direction.

7. The foldable vehicle according to claim 1, further comprising locking units (50) installed to the front vehicle body (10) to lock the rear vehicle body (20) to the front vehicle body (10) at a position where the rear vehicle body (20) is folded with respect to the front vehicle body (10) and a position where the rear vehicle body (20) is unfolded with respect to the front vehicle body (10).

8. The foldable vehicle according to claim 7, wherein each of the locking units (50) includes a locking block (51) installed at one side of the lower end of the rear vehicle body (20) and fitted around one end of the rotating shaft (15) to rotate around the rotating shaft (15) and having a plurality of locking openings (52) formed along a circumferential direction; a locking pin (53) horizontally movably installed at one side of the front vehicle body (10) to lock the locking block (51) by being inserted into one of the locking openings (52); a locking motor (54) horizontally moving the locking pin (53) by power supplied from the control unit (60).

9. The foldable vehicle according to claim 8, wherein the locking unit (50) further includes a pin guide member (55) installed to one side of the front vehicle body (10) to allow the locking pin (53) to be movably inserted.

10. The foldable vehicle according to claim 8, wherein a thread portion (53a) is formed on an outer peripheral surface of the locking pin (53), and a pin drive gear (54a) threadedly engaged with the thread portion (53a) and rotated by the locking motor (54) to move the locking pin (53) is connected to the locking motor (54).

11. The foldable vehicle according to claim 8, wherein the locking unit (50) further includes a locking detection switch for detecting whether the locking pin (53) is inserted in or pulled out of the locking opening (52).

12. The foldable vehicle according to claim 1, wherein the control unit (60) includes a folding detection unit (62) for detecting a state in which the rear vehicle body (20) is folded with respect to the front vehicle body (10), and an unfolding detection unit (63) for detecting a state in which the rear vehicle body (20) is unfolded with respect to the front vehicle body (10).

13. A method of controlling a foldable vehicle, comprising:
(a) detecting an unfolded state and a folded state of a rear vehicle body (20);
(b) supplying a folding drive unit with power to rotate the rear vehicle body (20) upward around a rotating shaft (15) and overlap the rear vehicle body (20) with a front vehicle body (10);
(c) stopping the act of the folding drive unit when the folded state of the rear vehicle body (20) is detected if the rear vehicle body (20) is in a predetermined position with respect to the front vehicle body (10), thereby.

14. The method according to claim 13, wherein before the step (b) is performed, support units (40) are operated to bring lower ends of support units (40) into contact with a ground surface.

15. The method according to claim 13, wherein when the rear vehicle body (20) is locked to the front vehicle body (10), before the step (b) is performed, the locked state of the front vehicle body (10) and the rear vehicle body (20) is released.

* * * * *